Patented Jan. 18, 1938

2,105,834

UNITED STATES PATENT OFFICE 2,105,834

MANUFACTURE OF PIGMENT

Edmund J. Flynn, Palmerton, Pa., assignor to The New Jersey Zinc Company, a corporation of New Jersey No Drawing. Application December 31, 1934, Serial No. 760,045

6 Claims. (Cl. 134—78)

This invention relates to the manufacture of pigments containing zinc sulfide, such, for example, as zinc sulfide pigment, lithopone, etc. The invention contemplates certain improvements in the manufacture of such pigments, more particularly in the step of calcining or muffling the crude pigment. The invention is particularly concerned with pigments containing zinc sulfide chemically precipitated by the reaction of hydrogen sulfide (or other soluble sulfide) and an aqueous solution of a zinc compound, and aims to ameliorate the deleterious effect on such pigments of the presence of free or excess sulfur during calcination.

It has been found that when zinc sulfide is precipitated under such conditions as to contain free or excess sulfur, the customary muffling or calcining operation followed by quenching to which the crude zinc sulfide precipitate must be subjected in order to transform it to zinc sulfide pigment results in the formation of a discolored product. Crude precipitates of zinc sulfide containing free or excess sulfur are ordinarily obtained when zinc sulfide is precipitated from an aqueous zinc sulfate solution with hydrogen sulfide gas. The free or excess sulfur may be present as elemental sulfur or sulfide sulfur in the form of $Zn(SH)_2$, or adsorbed SH ions, or adsorbed hydrogen sulfide. It has been found impracticable to remove this free or excess sulfur during the processing of the crude precipitate. A certain proportion of the free or excess sulfur is removed by washing the pigment; a certain amount can be removed by aging in the presence of excess zinc sulfate or end-pointing with soluble zinc salts; a certain amount can also be removed by treatment with alkalies such as caustic soda. However, these expedients do not remove enough of the free or excess sulfur to secure a satisfactory white pigment after the muffling and quenching step.

I have found that the injurious effect of free or excess sulfur on the color of the finished pigment can be entirely removed by carrying out the muffling or calcining operation in the presence of zinc oxide. When this is done, the zinc oxide combines with the free or excess sulfur during the muffling or calcination to form zinc sulfide. In consequence, the finished product contains less zinc oxide after the calcining and quenching operation than the amount originally incorporated in the zinc sulfide.

The present invention accordingly involves calcining the pigment containing crude zinc sulfide in the presence of a small amount of zinc oxide. Any free or excess sulfur associated with the zinc sulfide combines at the temperature of calcination (say, 500–900° C.) with the zinc oxide to form zinc sulfide. It is preferable to have enough zinc oxide present to insure the presence of a small amount of zinc oxide in the finished zinc sulfide pigment. Preferably the final calcined or muffled product should contain an appreciable amount of zinc oxide (e. g., more than 0.1%) but not more than 0.5% zinc oxide.

The zinc oxide may be added as such to the crude slurry of zinc sulfide pigment prior to the drying and muffling operations. The amount of zinc oxide to be used must be adjusted to the amount of free or excess sulfur in the crude zinc sulfide precipitate in order to obtain the desired zinc oxide content of the finished product. For example, in the case of a crude zinc sulfide precipitate obtained by the precipitation of zinc sulfide from zinc sulfate solution with hydrogen sulfide, from 0.5 to 2% zinc oxide may be added before the muffling in order to obtain a finished product containing from 0.1 to 0.35% zinc oxide.

The zinc oxide may likewise be incorporated in the crude zinc sulfide precipitate by forming it in situ during the end-pointing treatment of the crude precipitate after washing. Thus excess zinc sulfate may be added to the washed crude zinc sulfide precipitate obtained by the reaction of hydrogen sulfide with zinc sulfate solution, and an alkali such as sodium hydroxide may then be added in sufficient amount to precipitate zinc hydroxide in the crude pulp of the zinc sulfide precipitate. The zinc hydroxide thus precipitated is equivalent to zinc oxide since it will be transformed to zinc oxide in the first stages of the subsequent calcining or muffling treatment.

The invention is not only applicable to zinc sulfide prepared by the reaction of aqueous solutions of soluble zinc salts such as zinc sulfate with hydrogen sulfide but also to zinc sulfide precipitated under any conditions that result in the adsorption of SH ions or the presence of free or excess sulfur in the crude precipitate.

The term "excess sulfur" in the appended claims signifies sulfur present in excess of that combined with zinc as zinc sulfide, which excess sulfur may be present in the form of $Zn(SH)_2$, adsorbed SH ions, adsorbed hydrogen sulfide or elemental sulfur.

I claim:

1. The improvement in calcining a pigment containing zinc sulfide chemically precipitated by the reaction of hydrogen sulfide and a soluble zinc compound, said zinc sulfide containing a substance of the group consisting of Zn(SH)₂, adsorbed SH ions, adsorbed hydrogen sulfide and elemental sulfur, which comprises adding to and intimately admixing with the pigment from 0.5 to 2% of zinc oxide, and calcining the resulting mixture of pigment containing excess sulfur and zinc oxide at a temperature of at least 500° C.

2. The improvement in calcining a pigment containing chemically precipitated zinc sulfide with which is associated a small amount of excess sulfur which comprises adding to and intimately admixing with the pigment an amount of zinc oxide slightly in excess of that required to react with said excess sulfur to form zinc sulfide, and calcining the resulting mixture of pigment and zinc oxide at a temperature of at least 500° C. while said mixture still contains excess sulfur.

3. The improvement in calcining a pigment containing chemically precipitated zinc sulfide with which is associated a small amount of excess sulfur which comprises adding to and intimately admixing with the pigment an amount of zinc oxide sufficiently in excess of that equivalent to said excess sulfur to leave 0.1 to 0.35% zinc oxide in said pigment after reaction of said zinc oxide with said excess sulfur, and calcining the resulting mixture of pigment containing the excess sulfur and zinc oxide at a temperature of at least 500° C. to transform said excess sulfur to zinc sulfide.

4. The improvement in calcining a pigment containing zinc sulfide with which is associated a small amount of excess sulfur which comprises incorporating zinc oxide in the pigment and then calcining the pigment containing the excess sulfur at a temperature of at least 500° C. in the presence of the zinc oxide in amount sufficient to transform said excess sulfur to zinc sulfide.

5. A process for making pigment zinc sulfide which comprises reacting a zinc salt solution with a substance containing sulfide sulfur to produce a zinc sulfide precipitate contaminated with a small proportion of excess sulfur, adding to and intimately mixing with the contaminated precipitate enough zinc oxide to react with the excess sulfur to form zinc sulfide and leave from .1 to .5% of zinc oxide in the resulting mixture, and calcining the mixture containing the excess sulfur and the zinc oxide at a temperature of at least 500° C. to bring about a reaction between the excess sulfur and part of the zinc oxide.

6. A process for making pigment zinc sulfide which comprises reacting an aqueous solution of a zinc salt with hydrogen sulfide gas to produce a zinc sulfide precipitate contaminated with a small proportion of excess sulfur in the form of a substance in the group consisting of Zn(SH)₂, adsorbed SH ions, adsorbed hydrogen sulfide and elemental sulfur, adding to and intimately mixing with the contaminated precipitate from .5 to 2% of zinc oxide, and calcining the resulting mixture at a temperature in excess of 500° C. until its sulfur content is substantially all present in the form of zinc sulfide and an excess of zinc oxide remains.

EDMUND J. FLYNN.